(No Model.)
F. E. LYON.
RUBBER TIRE FOR VEHICLES.
No. 418,982. Patented Jan. 7, 1890.
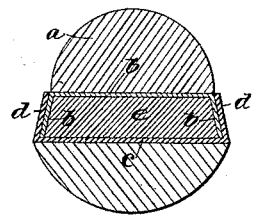
Fig. 1.
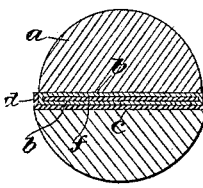
Fig. 2.
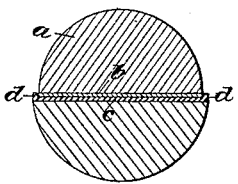
Fig. 3.
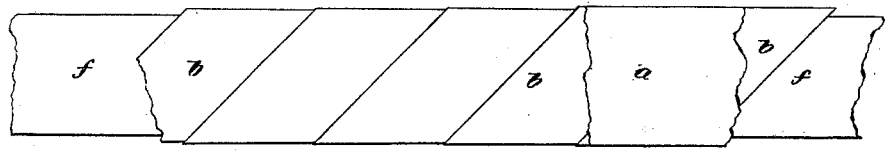
Fig. 7.
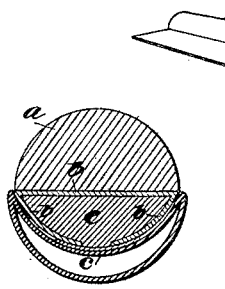
Fig. 4.
Fig. 5.
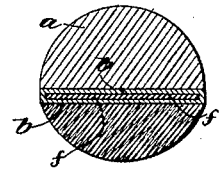
Fig. 6.
WITNESSES,
N. S. Amstutz
R. B. Moser
F. E. Lyon  INVENTOR.
By
H. T. Fisher
ATTORNEY.

UNITED STATES PATENT OFFICE.

FREMONT E. LYON, OF AKRON, OHIO.

RUBBER TIRE FOR VEHICLES.

SPECIFICATION forming part of Letters Patent No. 418,982, dated January 7, 1890.

Application filed September 13, 1889. Serial No. 323,821. (No model.)

*To all whom it may concern:*

Be it known that I, FREMONT E. LYON, a citizen of the United States, residing at Akron, in the county of Summit and State of Ohio, have invented certain new and useful Improvements in Rubber Bands for Tires or Wheels; and I do hereby declare that the following is a full, clear, and exact description of the invention, which will enable others skilled in the art to which it appertains to make and use the same.

My invention relates to improvements in rubber bands for tires or wheels; and the invention consists in a new article of manufacture, comprising a strip, band, roll, or the like of rubber provided with a base of fabric to which the rubber is inseparably fastened by any sufficient process or means, the whole producing an article suitable for use on the wheels of baby-carriages, bicycles, or other wheels where a yielding cushioned noiseless contact is desired.

Various means of securing rubber to the tires of wheels have been invented, and I do not regard myself as broadly the originator of this idea; but I am not aware that any one else ever has used india-rubber provided with a fabric base as an element of strength and means of securing the rubber to a wheel.

In the accompanying drawings, Figures 1, 2, 3, and 4 represent cross-sections of different forms of channel-iron tires or bands of wheels in which the rubber is secured, as hereinafter fully explained. Fig. 5 shows the rubber strip and fabric base united. Fig. 6 shows a section of the material with a sheet-metal core. Fig. 7 shows a base wound spirally about a metal core.

The invention is variously adaptable to wheels having flat or grooved tires, bands, or rims, and it is not material what purpose the wheel is used for, whether to run and carry a load or to employ the rubber for contact with another wheel to propel the same, as in carpet-sweepers.

I have shown the invention in a number of different forms and relations merely to convey some idea how widely it can be varied, particularly in adaptation, and still be within the scope of the invention. Obviously the modifications might be given great range and still be covered by the invention.

Primarily the invention is represented in Fig. 5. Here we have a plain rubber strip $a$, permanently secured on a base $b$ of fabric, preferably of heavy duck; but other suitable material may be used. The duck may be prepared with a coating or sheet of rubber applied under heavy rollers so as to be forced into the fibers of the material, and the rubber strip, roll, or band $a$ is vulcanized thereon and so firmly secured that the two practically become one article and inseparable. It is not designed that the base should be elastic, though it may be; but it must be flexible and of sufficient strength and durability to answer the uses to which it is applied. Thus, for example, as a band to encircle the tire of a baby-carriage it needs to have such strength and quality as will allow its use for fastening and holding the rubber on the tire without other means, so far as the rubber strip or band is concerned. The adhesiveness of the rubber to the base must therefore be such that the two are held absolutely inseparable under the most severe strain that may occur in the various uses to which the article is applied.

Fig. 1 represents one way of attaching this article to a wheel. In this figure $c$ is a channel tire or band having flanges $d$, of considerable height, and $e$ is a hoop or band of solid flexible material, like rattan, formed with slightly-converging sides, so that when the flanges $d$ are pressed inwardly the hoop $e$ will be firmly held thereby. The border of fabric $b$ is shown as held between the sides of the hoop $e$ and the flanges $d$, and this secures the rubber strip $a$ on the wheel without other fastenings.

Fig. 2 is a modification of the above, in that the flanges $d$ of the tire $c$ are very narrow and stand at right angles to the body of the tire. The hoop $e$ is omitted; but a strip of metal or other firm material $f$ is inserted between the folds of the base $b$, which extend entirely around the strip $f$ of the base $b$, and are cemented thereto.

Fig. 3 shows a tire with a flat base and exceedingly narrow flanges, having about the same elevation as the thickness of the fabric, and merely designed to be sufficient to keep the rubber in position laterally. In this instance the fabric is only as wide as the rubber band, and the whole is adhered to the tire and otherwise fastened at the ends, if required. In this instance, as in the others, the rubber has a flat side on which it is adhered to the base.

In Fig. 4 the tire has a groove filled, say, with a strip of rattan $e$, substantially as in Fig. 1, the apron or border of the base of the rubber extending, say, partially around the rattan filling, which is shaped to correspond to the form of the groove or channel, and, as in the other cases, has a flat upper surface corresponding to the flat base of the rubber.

In Fig. 6 we have a form not unlike Fig. 2, except that the tire is omitted and the edges of the fold meet between the rubber $a$ and the sheet-metal strip or core $f$.

Fig. 7 shows a core of sheet metal and a fabric base wrapped diagonally around said sheet, with the rubber strip or band $a$ vulcanized thereon after the wrapping has been completed. It is immaterial where these edges come when they overlap an inclosed part, and the tire may be of any practicable form and be adapted to use with my invention. Cores may be used or not. Whether a core be used or not, the rubber-encircling strip, with its base, is stretched around the tire and fastened at its ends, or also intermediately, if required, the manner of attaching to the tire being of minor concern.

For some purposes the rubber is prepared with the fabric base for use and sale, and it can be cut to any length desired. For other purposes the rubber and fabric are united at the time they are placed on the wheel, and examples of both ways are given in the foregoing description. The shape of the rubber may be considerably varied, according to the use to be made of it.

It will be seen that in all the views showing cross-sections of tires the flanges or exposed portions of the tire extend no higher than the outer surface of the fabric $b$. The object of this is to be able to wear the rubber clean away down to the fabric, and thus utilize all the rubber for actual service. In all other rubber wheels having rubber bands of which I am aware the construction is such that when the rubber wears down to the tire considerable rubber remains in the grooves or channels which cannot be used and is a dead loss, thus rendering wheels with rubber tires so expensive that they cannot generally be afforded. By my construction the entire rubber roll or band is exposed above the outer edge of the wheel, so that every particle of rubber can be worn away. Obviously, also, when such wearing away occurs a new band can be substituted at much less expense than a band that necessarily is more expensive, but has no greater length of life because it cannot all be used.

In case old forms of tire are used—say such, for example, as seen in Fig. 4—instead of filling the circular groove with rubber I build up with rattan or the like, and thus save the rubber and make a cheaper but equally valuable and serviceable rubber-tire covering.

Having thus described my invention, what I claim as new, and desire to secure by Letters Patent, is—

1. A new article of manufacture, consisting of a strip or band of rubber provided with a base of suitable fabric at one side, and a strip of metal adhered to said fabric, substantially as described.

2. A strip or band of rubber, in combination with a base of woven fabric adhered to the outside of the rubber and extending laterally on both sides thereof, whereby the fabric base may be clamped or folded in fastening the band upon the wheel, substantially as described.

3. A wheel having a suitable channel in its periphery to support a rubber covering, in combination with a covering consisting in a rubber strip or band having a sheet-fabric base and a metal strip to which said fabric is secured, the fabric and the metal strip adhered to the surface of the rubber, substantially as described.

4. A rubber strip adhered along its surface to a fabric base and a flat flexible strip adhered to said fabric on the opposite side from the rubber, substantially as described.

5. A rubber band having a fabric base adhered to its under side and a metallic strip adhered to said fabric, said strip having its ends constructed to be firmly attached to the wheel, substantially as described.

6. A rubber band with a substantially-flat under side, a thin metal strip adapted to be bent around a wheel, and a fabric base adhered to the rubber band and the metal strip, all said parts made continuous and of equal length, whereby the material so made may be cut into lengths and firmly fastened on a wheel, substantially as set forth.

7. A rubber strip or band having a base of greater width than said rubber, and a flexible core upon which said base is inclosed, substantially as set forth.

8. A wheel having a channel in its periphery, in combination with a rubber strip or band having a fabric base and a flexible core lying in said channel and substantially filling the same, substantially as set forth.

In testimony whereof I hereunto set my hand this 29th day of August, 1889.

FREMONT E. LYON.

Witnesses:
F. H. WATERS,
CHAS. BAIRD.